(No Model.)
G. A. STILES.
CYCLOMETER.
No. 345,188. Patented July 6, 1886.
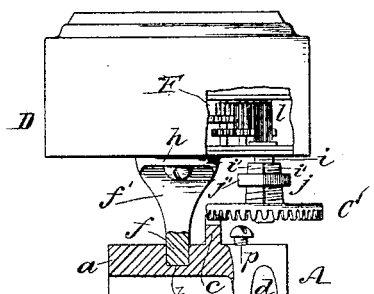
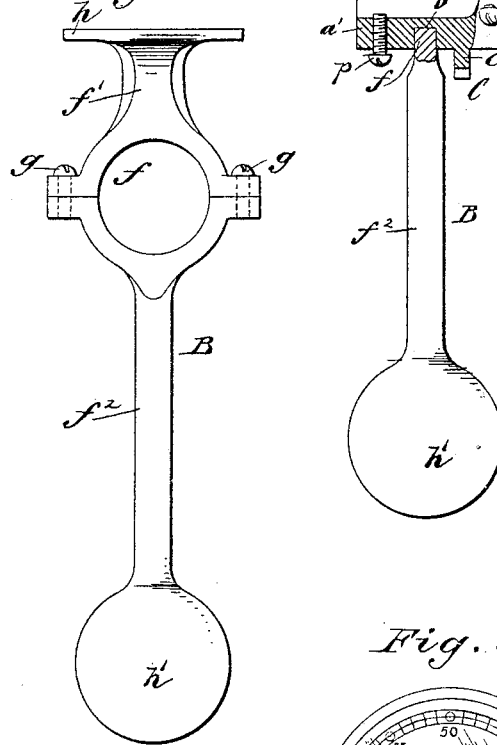
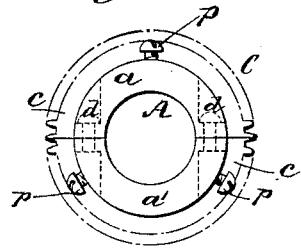
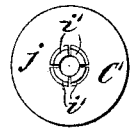
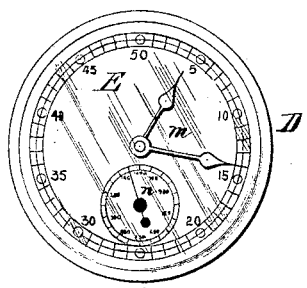
WITNESSES:
INVENTOR:
G. A. Stiles
BY Munn & Co.
ATTORNEYS.

UNITED STATES PATENT OFFICE.

GEORGE A. STILES, OF NEWARK, NEW JERSEY.

CYCLOMETER.

SPECIFICATION forming part of Letters Patent No. 345,188, dated July 6, 1886.

Application filed October 15, 1885. Serial No. 179,964. (No model.)

*To all whom it may concern:*

Be it known that I, GEORGE A. STILES, of Newark, in the county of Essex and State of New Jersey, have invented a new and Improved Cyclometer, of which the following is a full, clear, and exact description.

Reference is to be had to the accompanying drawings, forming part of this specification, in which similar letters of reference indicate corresponding parts in all the figures.

Figure 1 is a sectional elevation of my new and improved cyclometer. Fig. 2 is a detached view of the pendent lever that supports the registering mechanism and dial. Fig. 3 is a plan view of the axle-collar detached. Fig. 4 is a similar view of the intermediate cog-wheel, and Fig. 5 is a plan view of the dial.

The invention consists of certain details of construction of the parts of the device, whereby it is made cheap and practical and whereby direct gearing is employed for communicating motion from the axle to the registering mechanism.

A represents the hollow hub or collar that is to be attached to the axle of a bicycle or other vehicle. This hollow hub is cast in two semicircular parts, $a\ a'$, each with a semicircular groove, $b$, and a semicircular cogged flange $c$, so that when the parts $a\ a'$ are secured together edge to edge by screws $d$, a complete annular groove is formed around the hub to receive the ring portion $f$ of the pendent lever B, and also a complete circumferential cog-wheel, C, to operate the intermediate cog-wheel, C'.

The pendent lever B is cast in two parts, $f'\ f^2$, secured together by the screws $g$, and the part $f'$ is formed with the flat portion $h$, to support the casing D, that contains the dial E and registering mechanism F, while the lower end of the part $f^2$ is formed or provided with a heavy ball, $h'$, for counterbalancing the casing and inclosed registering mechanism to keep the same and lever B always upright.

The intermediate cog-wheel, C', is attached to the lower end of the small upright shaft $i$, which protrudes from the bottom of the casing D, so that the said gear-wheel C' meshes with the toothed flange $c\ c$ of the hollow hub A, so the revolution of the hub A will turn gear-wheel C' and operate the registering mechanism. For attaching the wheel C' to the shaft $i$, I form it with the sectional externally-screw-threaded and conical flange $j$, on which is placed the screw-nut $j'$, which, when screwed down upon the flange, will clasp the sections $i'$ of the flange upon the shaft $i$ and firmly hold the wheel C' thereto. By loosening the nut $j'$ the wheel C' may be easily adjusted up or down upon the shaft $i$, to properly engage it with the cogged flanges $c\ c$.

Upon the shaft $i$, within the casing D, is secured the cog-wheel $l$, which communicates motion to the registering mechanism F, which in turn communicates slow motion to the hands $m$ and $n$, and causes them to move over the dial E the same as the hands of a watch, to point to the graduations marked upon the dial.

In use the parts of the hub A will be placed upon the axle of a vehicle and secured together by the screws $d$ and made fast to the axle by the set-screws $p$, so that when the axle revolves the hub A will revolve with it. The hub A, being thus put in place, the parts of the pendent lever B will be put together upon the hub in the grooves $b$ and secured by the screws $g$. The parts $f'\ f^2$ of the lever B fit loosely in the groove $b$, so the ball $h'$ of the lever always keeps the lever and casing D upright, and does not interfere with the revolution of the hub A. The size of the cog-wheels C C' will bear a relation to the size of the vehicle-wheel and registering mechanism F, so the movement of the vehicle along the ground will be registered upon the dial according to the distance covered.

There will be interchangeable hubs A with each device, to correspond with vehicle-wheels of different diameters, and by making said hub in sections and making the intermediate gear, C', adjustable upon the shaft $i$, the device may be easily fitted with a hub, A, to suit any sized vehicle-wheel, so the device is thus adapted to be applied to any vehicle and will accurately register the distance covered.

Having thus described my invention, what I claim as new, and desire to secure by Letters Patent, is—

1. The cyclometer herein shown and described, consisting of the registering mechanism, casing, and dial secured to a pendent lever supported by the hollow hub A, which is formed in two parts, $a$ $a'$, and each with a cogged semicircular flange, $c$, in combination with the intermediate gear-wheel, C', adjustably attached to the shaft $i$, substantially as described.

2. In a cyclometer, the intermediate gear, C', formed with a sectional screw-threaded and conical hub, in combination with a nut placed upon the hub, for clasping the wheel to the shaft $i$, substantially as described.

GEORGE A. STILES.

Witnesses:
H. A. WEST,
EDGAR TATE.